Sept. 17, 1963   G. W. KEENE   3,103,916
ANIMAL RUBBING AND LIQUID APPLYING APPARATUS
Filed May 23, 1962   3 Sheets-Sheet 1
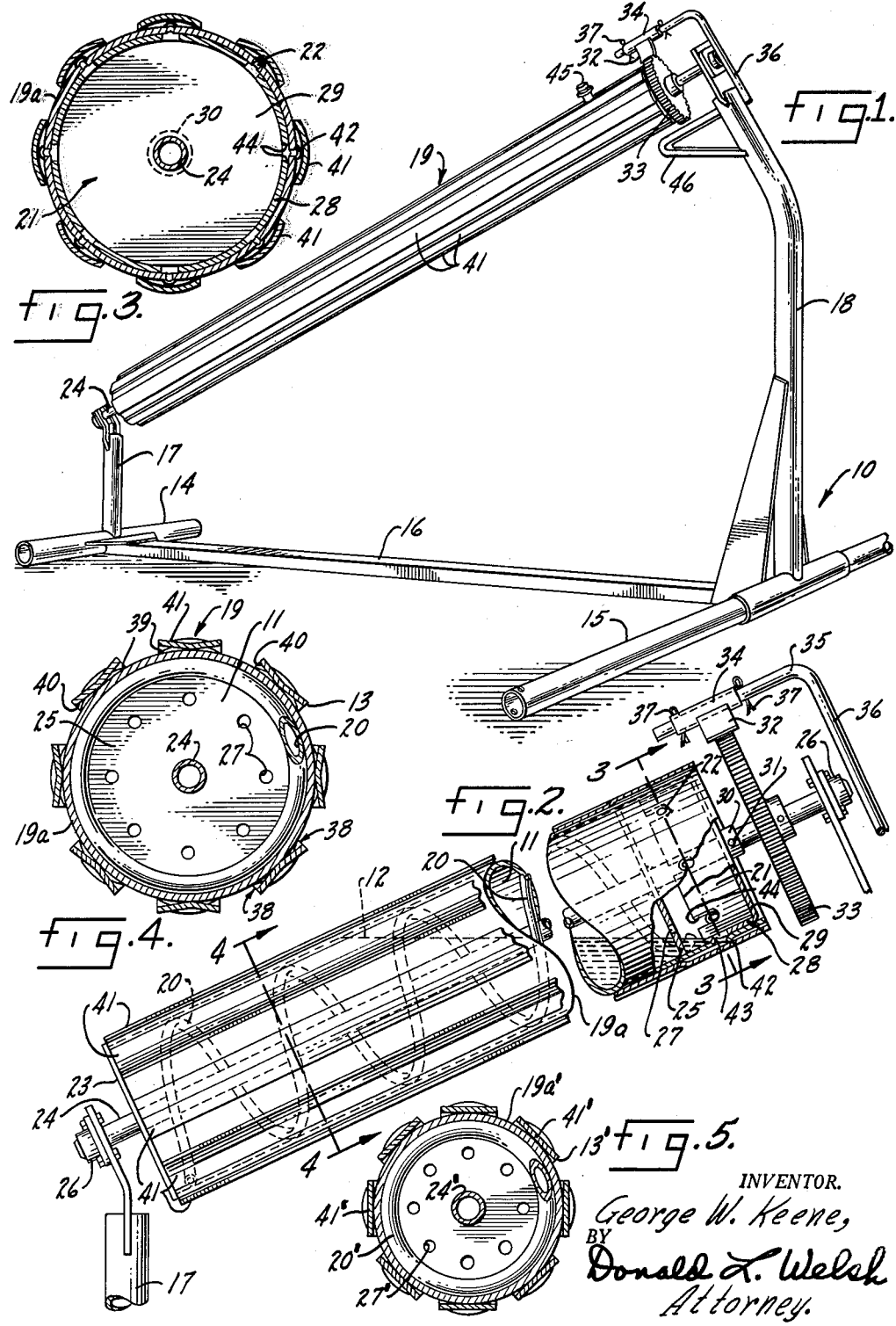
INVENTOR.
George W. Keene,
BY Donald L. Welsh
Attorney.

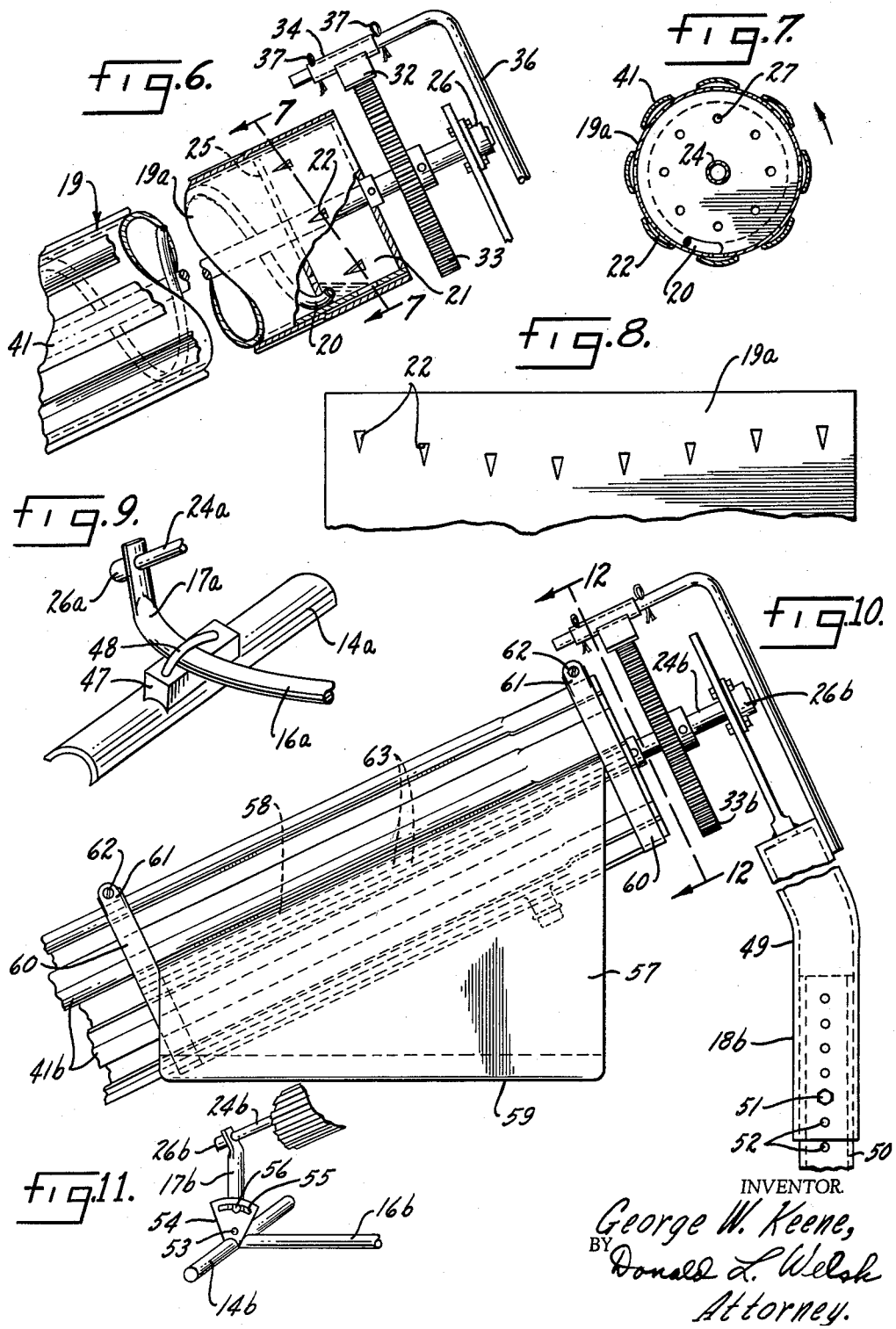

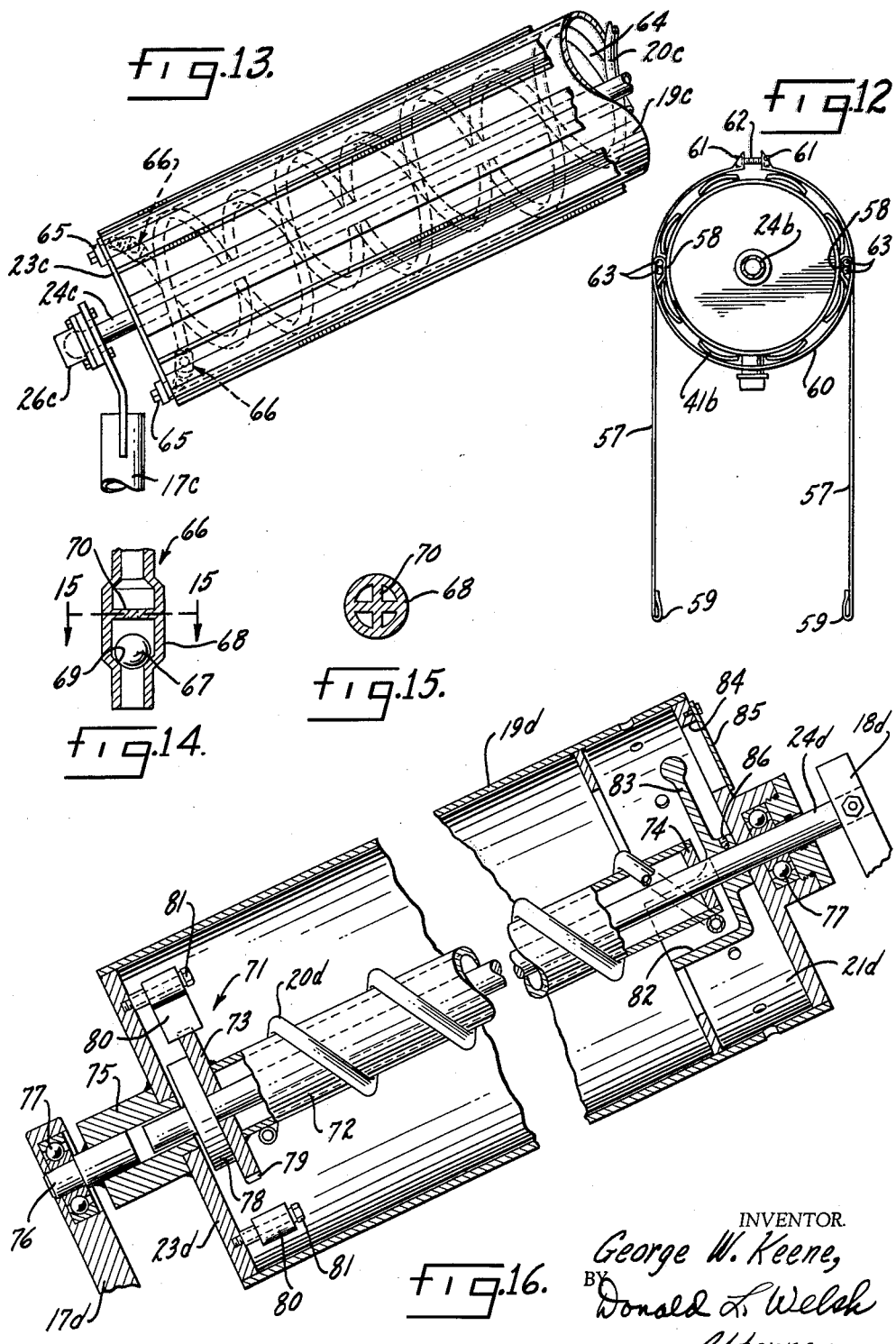

United States Patent Office 3,103,916
Patented Sept. 17, 1963

3,103,916
ANIMAL RUBBING AND LIQUID APPLYING
APPARATUS
George W. Keene, Rochelle, Ill.
Filed May 23, 1962, Ser. No. 198,411
20 Claims. (Cl. 119—157)

This invention relates generally to apparatus for use by livestock such as cattle and pigs for rubbing or scratching their hides and also applying liquids, for example, insecticides and hide conditioning agents, to the hides during the rubbing. More particularly, the invention relates to rubbing and liquid applying apparatus including a reservoir for the liquid and some means such as a pump operable during and in response to rubbing by an animal to transfer the liquid from the reservoir to the exterior surfaces of the apparatus engaged by the animal.

The primary object of the invention is to provide improved apparatus of the above character which, as compared to similar prior apparatus, is simpler and less expensive to construct, is easire to maintain, and is more durable and reliable in operation.

Another object is to provide improved animal rubbing and liquid applying apparatus in which the liquid transfer means is constructed in a novel manner to insure an easily controlled flow of liquid to the exterior surfaces and a uniform distribution of the liquid over such surfaces while withstanding the heavy pressures placed on the apparatus by the animals.

A further object is to provide a simple and inexpensive liquid transfer means having few moving parts likely to be damaged or to malfunction.

Still another object is to provide a novel liquid transfer means readily adaptable to use with different liquids under different operating conditions, including changing viscosity of the liquid.

The invention also resides in the novel construction of the portion of the apparatus engaged by the animals to retain the liquid available at such surfaces and distribute it uniformly over the surfaces.

Other objects and advantages of the invention will become apparent from the following detailed description taken in conjunction with the accompanying drawings in which—

FIG. 1 is a perspective view of rubbing and liquid applying apparatus embodying the novel features of the present invention;

FIG. 2 is a fragmentary enlarged side elevational view of the apparatus, some parts of which have been broken away and shown in section;

FIGS. 3 and 4 are sectional views taken along the lines 3—3 and 4—4, respectively, of FIG. 2, FIG. 3 being drawn to an enlarged scale; and FIG. 5 is a reduced view similar to FIG. 4 and showing a modified construction.

FIG. 6 is a fragmentary view similar to FIG 2 and showing a modified outlet hole construction.

FIG. 7 is a sectional view taken along the line 7—7 of FIG. 6.

FIG. 8 is a fragmentary development of the upper end portion of the reservoir tube showing the spacing of the modified outlet holes from the upper end of the tube.

FIG. 9 is a fragmentary perspective view similar to FIG. 1 and showing a modified supporting construction for the lower end portion of the reservoir tube.

FIG. 10 is a fragmentary side elevational view similar to FIG. 2 and showing a modified supporting frame structure for the upper end portion of the reservoir tube and an oil distribution attachment.

FIG. 11 is a fragmentary perspective view similar to FIG. 1, but drawn to a reduced scale, and showing a modified support for the lower end portion of the tube intended for use with the modification of FIG. 10.

FIG. 12 is a sectional view taken along the line 12—12 of FIG. 10.

FIG. 13 is a fragmentary side elevational view of the lower end portion of the reservoir tube similar to FIG. 2 and showing a modified pump construction.

FIG. 14 is an enlarged, fragmentary sectional view of the lower end portion of one of the Archimedes screws of the modification of FIG. 13.

FIG. 15 is a sectional view taken along the line 15—15 of FIG. 14; and

FIG. 16 is a fragmentary enlarged cross sectional view of another alternative construction of the reservoir and pump.

The present invention is especially suited for conditioning the hides of animals such as cattle or pigs. For this purpose, there is provided a surface against which the animals may rub or scratch their hides and to which a liquid is applied for transfer to the hides during the rubbing. The liquid may be made up of well known hide conditioning agents including oil and insecticides.

In general, the apparatus shown in the drawings to illustrate the invention comprises a frame 10 adapted to rest on a horizontal supporting surface such as the ground as shown in FIG. 1, a reservoir 11 for containing the liquid 12 to be applied to the hide, exterior surfaces 13 against which the animals may rub, and means for transferring the liquid from the reservoir to the exterior surfaces. The frame 10 in this instance comprises spaced parallel horizontal pipes 14 and 15 of different lengths perpendicular to and secured as by welding to opposite ends of a horizontal bar 16 extending between the pipes and adapted to lie against the ground or other horizontal supporting surface with the pipes. Upstanding from and secured rigidly to the pipes at opposite ends of the bar are two posts 17 and 18 which support between them a member 19 providing the rubbing surface on its exterior.

To simplify the construction, the rubbing member 19 also provides the reservoir 11 for the liquid 12. In the preferred form of FIGS. 1 to 4, the reservoir is the interior of a hollow cylindrical tube 19a rotatably supported at its opposite ends on the posts 17 and 18, the interior of the cylinder constituting the reservoir. To obtain distribution of the liquid 12 throughout the length of the exterior of the cylinder, one post 18 preferably is made longer than the other so that the axis of the cylinder is inclined with respect to the horizontal. With this arrangement, the liquid is delivered to the exterior surfaces at the higher end portion of the cylinder from which it may gravitate along the cylinder to its lower portions.

In one of its aspects, the present invention contemplates the provision of novel means for transferring the liquid 12 from the reservoir 11 within the cylinder 19 to the exterior of the cylinder at its higher end portion. This means is constructed in a novel manner to achieve simplicity and low expense in its construction and maintenance and reliability in its operation while delivering the liquid only during a period when the exterior surfaces 13 are engaged by an animal. For achieving these purposes, the transfer means comprises a rotatably mounted Archimedes' screw 20 spiralling upwardly about the axis of the reservoir and adapted to carry liquid from the reservoir to its upper end during rotation of the screw in one direction. The force of an animal rubbing the exterior cylinder surfaces 13 in one direction is utilized to turn the screw in a direction to raise the liquid and a reverse flow is prevented during the application of the opposite force by the animal. At its upper end, the screw delivers the liquid to a chamber 21 which communicates with the exterior of the cylinder through outlet holes 22. These are angularly spaced around the upper end portion of the cylinder to distribute the liquid around the circumference of the cylinder.

The reservoir cylinder 19a in this instance is a cylindrical metal tube closed at its lower end by a circular plate 23 secured to the tube as by welding around its periphery. The support for the tube includes a shaft 24 extending through and welded to the lower end plate and to an intermediate plate 25 disposed within and welded to the tube at a point spaced below the upper end of the tube. Suitable bearings 26 mounted on the two posts 17 and 18 receive the ends of the shaft and support the shaft and the tube for rotation while preventing their axial movement with respect to the posts.

While the Archimedes' screw 20 may take other forms such as a channel opening radially and outwardly from its axis of rotation, in this instance it is a hollow tube of metal lying against and secured as by welding to the inner periphery of the reservoir tube 19a. The screw, as viewed from the left in FIG. 2, spirals upwardly along the length of the tube in a counterclockwise direction so that clockwise rotation is required to carry liquids upwardly along its length. At its upper end, the screw extends through and is sealed to the intermediate plate 25 which defines one wall of the chamber 21. The side wall of the chamber is defined by the upper end portion of the reservoir tube. The height of the liquid within the chamber is limited by forming an annular series of holes 27 in the intermediate plate.

Various means may be provided to control the amount of liquid 12 delivered to the exterior of the reservoir tube 19a through the outlet holes 22. While this may be accomplished by an adjustable valve on the upper end portion of the Archimedes' screw 20, the rate of outlet flow is controlled in this instance by the provision of a sleeve 28 which telescopes within the upper end portion of the reservoir tube and is adjustable along the axis of the tube to different positions to uncover different amounts of the outlet holes. The sleeve is a part of a cup-shaped member having a bottom plate 29 closing the open end of the tube and defining the upper wall of the chamber. A collar 30 secured to this bottom plate and telescoping over the shaft 24 supports the cup on the shaft and is secured in different positions of axial adjustment by a set screw 31 threaded into the collar and engaging the shaft.

As stated above, clockwise rotation of the screw and reservoir tube 19a as viewed from the left of FIG. 2 results in upward flow of liquid along the screw. Rotation of the screw in the opposite direction would tend to produce a reverse or downward flow.

Reverse or downward flow of the liquid 12 in the Archimedes' screw 20 during the application by an animal of a force exerted in a direction to rotate the reservoir tube 19a in a counterclockwise direction is prevented in the preferred construction of FIG. 1 by limiting rotation of the reservoir tube and thus the screw to the clockwise direction in which the screw raises the liquid. This is accomplished by a pawl 32 and a ratchet 33 which permit the reservoir tube assembly, including the screw, to turn clockwise as viewed from the left in FIG. 2 but which prevent rotation in the opposite direction. The ratchet in this instance is in the form of a wheel secured to the tube shaft 24 at its upper end. The cooperating pawl is in the form of a leaf projecting rigidly from a sleeve 34 which telescopes loosely over an arm 35 secured to and projecting rigidly from the upper end portion 36 of the longer post 18. The sleeve is held on the arm by suitable cotter pins 37 and permits the pawl to gravitate into operative engagement with teeth on the periphery of the ratchet wheel. To limit movement of the pawl circumferentially away from the ratchet, the lower end of the sleeve is formed with slots which receive the lower cotter pin with a lost motion permitting only the desired movement of the pawl.

In another of its aspects, the present invention contemplates a novel construction of the rubbing surfaces 13 to insure uniform distribution of the liquid 12 along the length of the reservoir tube 19a. To this end, circumferentially opening channels 38 located on the exterior of the reservoir tube extend throughout the length of the tube and guide the liquid along such length. These channels are defined by opposed surfaces 39 and 40 facing radially and engaging opposite sides of drops of the liquid to hold the liquid by surface tension and prevent it from dropping off of the reservoir tube while guiding it along the length of the tube.

In the present instance, the opposed surfaces 39 and 40 defining each channel are the outer periphery of the reservoir tube 19a and the inner face of a generally flat elongated bar or strap 41 formed of a rigid metal secured as by welding to the outer periphery of the reservoir tube and extending throughout its length. Where, as shown in the drawings, the reservoir tube is of rather large diameter, the desired spacing of its outer periphery and the inner faces of the straps to form the groove is obtained by making the strap of V-shaped cross section as shown in FIG. 4 so that it flares outwardly away from the tube. For tubes of smaller diameter, the straps may be flat as shown in FIG. 5 in a modified construction, the parts of this construction which correspond to the construction of FIGS. 1 to 4 having similar but primed reference characters. The outer edges of the straps provide the exterior tube surfaces 13 engaged by the animals and, being raised from the periphery of the tube, present a roughened surface to produce a more effective rubbing or scratching action.

To insure the flow of liquid 12 into the channels or grooves 38, the upper ends of the straps 41 preferably overlie the outlet holes 22, there being one outlet hole for each strap in the present instance. Such flow is encouraged further by curving the upper end portion of the strap as shown in FIG. 3 to provide a concave surface facing the outlet holes to receive the liquid from the holes. To keep the upper end portions of the straps spaced from the periphery of the tube 19a, and thereby prevent closure of each outlet hole, it also is desirable to upset the periphery of each hole as shown in FIG. 2, thereby providing a radially and outwardly projecting lug 42 engaging the concave face of the strap to hold it spaced from the tube.

As an incident to upsetting the peripheries of the outlet holes, lugs 43 also may be formed on the inner side of the reservoir tube 19a. These serve not only to engage the flow control sleeve 28 and limit its inward movement, but also, may engage the side edges 44 of slots formed in the sleeve to prevent turning of the sleeve with respect to the reservoir tube.

Once assembled, the apparatus is prepared for use by at least partially filling the reservoir 11 in the lower end portion of the tube 19a as through an inlet pipe 45 with a removable cap. With the pawl 32 in its proper position to permit only clockwise rotation of the tube as viewed from the left in FIG. 2, the tube is rotated by hand in such direction to fill the upper chamber 21 to the level permitted by the overflow holes 27 and also to deliver some liquid through the outlet holes 22 to the straps 41 and thence along the channels 38 throughout the length of the tube. Upon engagement of the edges of the straps by an animal and a rubbing movement of the animal back and forth crosswise of the tube, the tube tends to rotate back and forth during such movement. Due to the pawl 32 and ratchet 33, however, such rotation occurs only in the proper direction that the liquid is raised by the Archimedes' screw 20 to the upper chamber. Such delivery continues only so long as an animal rubs the tube.

When the rubbing stops, the delivery stops and the liquid 12 tends to remain in the channels 38 due to the surface tension as discussed above. By adjusting the amount of the outlet openings 22 uncovered by the sleeve 28, the rate of flow of the liquid can be adjusted for liquids of different viscosities and for desired quantities of delivery of the liquid. If desired, a suitable guard 46 may be attached to the higher post 18 to project beneath the ratchet wheel 33 and the upper end portion of the reservoir tube 19a to prevent animals from contacting these parts and damaging them or closing the holes. Also, a projecting guard ring (not shown) may be secured to and extend around the upper end portion of the reservoir tube adjacent the plane of the outlet holes to prevent contact of this portion by animals and a consequent plugging of the holes.

The reservoir tube 19a being inclined at an angle with respect to the horizontal, the Archimedes' screw 20 discharges liquid at a greater rate when its upper or outlet end is in the lower portion of each revolution than when in other portions. To obtain a uniform transfer of liquid from the outlet chamber 21 in different angular positions of the tube even though the single Archimedes' screw delivers fluid in different amounts during rotation through such positions, the invention contemplates locating the outlet holes 22 in different positions longitudinally of the tube and correlating these positions with the angular positions of the holes in relation to the outlet end of the screw so that, when the screw is in the lower portion of each revolution and delivering larger amounts of liquid, the effective outlet holes will be located higher and nearer the top of the tube to retain some of the liquid in the outlet chamber for discharge during the other portions of the revolution when the screw is delivering less fluid, the holes which are effective during such other portions being located in lower positions along the tube. This relationship is achieved by spacing that outlet hole or holes which are in alignment with the outlet end of the screw longitudinally of the tube upwardly along the tube from the bottom wall 25 of the outlet chamber a distance greater than the spacing of the hole or holes located diametrically opposite to the outlet end of the screw. The intermediate holes between the highest and lowest hole are then spaced progressively different distances from the plate. With this arrangement, the holes lie generally along the intersection of the reservoir tube with a plane which is inclined relative to the cylinder axis.

The desired staggering of the outlet holes 22 to achieve substantially uniform transfer of liquid from the outlet chamber 21 to the exterior of the reservoir tube 19a in the different angular positions of the tube even though the Archimedes' screw 20 delivers different amounts of liquid in the various positions is illustrated in FIGS. 6, 7, and 8. From these figures, it will be seen that the holes lie along the intersection of the plane with the reservoir tube as described above and, in a fragmentary development view of the latter as shown in FIG. 8, are arranged generally to form a sine wave. With this arrangement and with the holes which are aligned longitudinally with the outlet end of the screw being spaced the farthest distance from the bottom plate 25 of the outlet chamber, the liquid retained in the bottom of the chamber is greatest when the outlet end of the screw is in its lowermost position and decreases gradually as the reservoir and tube rotate to the highest position of the screw. Substantially equal amounts of liquid thus are permitted to gravitate through the outlet holes to the exterior of the tube in all of the different angular positions of the tube. The flow into the outlet chamber may be regulated by a suitable adjustable valve (not shown) mounted in the outlet end portion of the Archimedes' screw.

The outlet holes 22 also are shaped individually in a novel manner to vary the amount of the outlet flow of liquid in proportion to the amount of usage of the apparatus by animals, that is, to provide a faster flow when there is a greater use and a smaller flow when the amount of turning of the reservoir tube 19a decreases. Each hole thus is triangular or of wedge-shape with its narrowest end pointing longitudinally of the reservoir tube and downwardly toward the lower end of the tube as shown in FIG. 6. This shape of the holes permits gravitation of liquid at a greater rate when the tube is turned faster to deliver more liquid through the screw so that the level of liquid in the outlet chamber 21 rises to the upper end portions of the holes. Then, as the rate of turning of the tube decreases and less liquid is delivered, the level of liquid in the chamber falls to the lower pointed end portions of the holes which permit outward flow at a lower rate.

The liquid 12 usually contains oil and its viscosity changes with variations in temperature. To compensate for such changes in viscosity and, also, variations in the slope of the supporting surface for the apparatus and still obtain downward flow of the liquid along the exterior of the tube at a desired rate, the mounting for the reservoir tube 19a is adjustable to permit variation of the angle of inclination of the tube axis and thus the effective gravitational pull on the liquid. The adjustment may be obtained in various ways. One way illustrated in FIG. 9 is to provide a rigid frame as in the preferred construction of FIG. 1 and vary the position of one of the supporting feet 14 and 15 with respect to frame.

Referring to FIG. 9, parts which correspond to parts of the FIG. 1 construction bear similar reference characters with the suffix a. Instead of being formed separately from the horizontal bar 16a the shorter post 17a is an upwardly curved end portion of an elongated tubular member whose intermediate portion corresponds to the horizontal bar. The horizontal crosspiece or foot 14a, instead of being secured permanently to the bar and post, is secured releasably and is slidable along the post and bar to different positions spaced vertically different distances from the bearing 26a supporting the lower end of the reservoir tube shaft 24a. The heighth of the lower end of the tube with respect to the upper end and thus the inclination of the tube axis thus are changed.

In the present instance, the adjustable foot 14a at the lower end portion of the reservoir tube is an elongated plate curved transversely. On its convex upper side, the plate is secured as by welding to a block 47 which engages the underside of the post 17a and horizontal bar 16a to elevate the bar above the ground. The bar is secured releasably to the top of the block by a bolt 48 of U-shape having a closed end engaging the top of the bar and spaced legs extending through apertures in the block and the foot and threaded into nuts (not shown) lying against the convex underside of the foot. When it is desired to change the angle inclination of the reservoir tube, the U-bolt is loosened and the foot is shifted upwardly toward or downwardly away from the lower end of the tube respectively to lower or to raise the tube. When the desired angle is reached, the U-bolt may be retightened to secure the block in place on the post.

Whereas the length of the shorter post 17a is adjusted to change the angle of inclination of the reservoir tube by changing the position of one foot 14a in the modification of FIG. 9, the angle also may be changed by varying the length of the longer post. This mode is illustrated in FIGS. 10 to 12 in which parts corresponding to parts shown in FIG. 1 bear similar reference characters with the suffix b. In this modification, adjustment of the length of the longer post 18b is achieved by dividing the post into two sections 49 and 50, the lower one of which telescopes within and is shiftable longitudinally of the upper section. To secure the sections together in different positions of adjustment, one or more bolts 51 extend through alined, equally spaced holes 52 in the two sections, the bolt being removable to permit relative shifting of the sections.

Lengthening and shortening of the longer post 18b in the modification of FIGS. 10 to 12 is accompanied by a tendency for a change in the angles of the shaft 24b with respect to the posts and a change in the horizontal spacing of the bearings 26b at the ends of the shaft. These changes are made possible by utilizing so-called self-aligning bearings permitting the angles of the shaft to be changed with respect to the posts. Also, the shorter post 17b is mounted on the adjacent foot 14b to swing about a horizontal axis in the plane of the tube shaft and the longer post. Herein, the lower end of the post is pivoted on a shaft 53 carried by a vertical plate 54 welded to the foot and having an arcuate slot 55 receiving a clamping bolt 56 by which the post is secured in adjusted position.

To augment the action of the straps 41 in retaining liquid on the exterior of the reservoir tube 19a where the tube will be contacted by animals, it is desirable to have an absorbent material to receive the liquid as it gravitates along the bars and to release such liquid upon contact with the animals' hides. In accordance with another aspect of the invention, this material is releasably attached to the reservoir tube in a novel manner and is shaped to avoid loss of the liquid which might otherwise occur due to the inclination of the tube axis. For this purpose, the absorbent material is in the form of sheets 57 of generally triangular shape each having one edge portion 58 extending longitudinally of the tube and clamped against the tube and another edge portion 59 intersecting the first edge portion at the same angle that the axis of the tube is inclined with respect to the horizontal. The second edge portion then is disposed automatically in a horizontal position so as to retain liquid which has gravitated along the cloth from the tube. Conveniently, the first edge portion of the cloth is clamped against the exterior of the reservoir tube by bars which extend along and lie within the recesses defined by and located between the straps.

In the preferred construction shown in FIGS. 10 and 12, there are two liquid distributing cloths 57 and these are part of a unit including clamping members 60 which may be formed separately from the tube but secured releasably thereto. There are two clamping members in the form of separate rings having lugs 61 projecting radially and outwardly to receive bolts 62 by which the ends of the rings are drawn together tightly about the straps 41b as shown in FIGS. 10 and 12. For each cloth, there are two round bars 63 welded together and to one of the separate rings at one end of the bars. The other ends of the bars are free to telescope within the folded-over edge portion 58 of the cloth which is to be clamped against the outer sides of the reservoir tube between adjacent straps. The exposed portions of the bars are slightly longer than the telescoping edge portion of the cloth so that the free ends of the bars may be clamped beneath the other separate ring.

It will be apparent that the absorbent cloths 57 and their supporting clamping members 60 may be assembled on the exterior of a reservoir tube 19a without disassembly of the latter. Thus, the separate ring 60 with the bars 63 attached may be widened to receive the center portion of the reservoir tube after the bolt 62 for the ring has been removed from one of the lugs 61 and then may be tightened around the tube after reinsertion of the bolt, the bars being positioned within the recesses on diametrically opposite sides of the tube between adjacent ones of the straps 41b. Either before or after such clamping, the folded-over edge portions 57 of the cloths may be telescoped over the bars 63 and, following this operation, the second ring 60 may be extended around the tube and its bolt 62 tightened to clamp the free end portions of the bars against the tube.

When either cloth 57 becomes worn, the second ring 60 may be loosened and moved axially off the free end portions of the bars 63 to permit the cloths to be removed and replaced after which the ring is replaced. When the cloths are clamped in proper positions against the outer side of the tube with their lower edges disposed horizontally as shown in FIG. 10, liquid delivered to the exterior of the tube and flowing downwardly along the straps 41b is absorbed by the cloths and gravitates along the cloth to their lower edge portions. There, the liquid is available for delivery to animals contacting the cloths even though the animals do not raise high enough to contact the reservoir tube. By virtue of the horizontal disposition of the lower edges of the cloths, liquid tends to remain on the cloths rather than running off.

The novel Archimedes' screw pump 20 also may be used where it is desired to rotate the reservoir tube 19a in both directions rather than limit such rotation to one direction as in the preferred construction of FIGS. 1 to 4. In one modified construction shown in FIGS. 13 to 15, delivery of liquid is achieved in both directions of rotation of the reservoir tube by the provision of a second Archimedes' screw 64 in addition to the first screw. The parts of this construction which correspond to those shown in FIGS. 1 to 4 bear the same reference characters with the suffix c. The first screw 20c spirals in one direction so as to deliver liquid upon rotation of the tube in one direction, herein clockwise as viewed from the left in FIG. 13, and the other screw 64 is spiralled in the opposite direction to deliver liquid when the tube 19c and the screw rotate in the opposite direction. The screws in this instance are of the same construction as the screw shown in FIGS. 1 to 4 and are welded to the interior of the reservoir tube. Draining of the tube and cleaning of the screws may be effected conveniently by the provision of plugs 65 threaded into apertures in the bottom end plate 23c of the tube adjacent the lower ends of the screws.

To prevent reverse or downward flow of each of the screws 20c and 64 of the double rotation tube 19c of FIG. 13 when the tube rotates in a direction opposite to that which produces upward flow in the screw, check valves 66 are mounted in the lower or entering ends of the screws. Each valve permits upward flow of liquid through its associate screw when rotation of the screw and tube is in the proper direction for such flow. When the rotation is reversed, however, the check valve prevents the reverse or downward flow of liquid in the screw. In the present instance, the check valves are of the ball type and each comprises a ball 67 which is shiftable freely along the tube within an enlarged portion 68 thereof and moves between a position of sealing engagement with an axially facing seat 69 when fluid tends to flow downwardly in the screw and a position spaced from the seat to permit fluid to flow upwardly into the screw. Movement of the ball away from the valve seat is limited by a stop 70 in the form of an open grill work which permits the flow of fluid upwardly while blocking the movement of the ball.

Each ball 67 is formed of a material light enough that it will shift back and forth between the valve seat 69 and the stop 70 in response to tendencies of the liquid to change direction. Thus, when the tube 19c and the screw 20c or 64 associated with the ball are turning in a direction to produce downward flow of liquid in the screw, the ball is urged into engagement with the valve seat to block such flow. Upon reversal of the rotation of the tube and screw, the ball shifts away from the seat and into engagement with the stop to permit the upward flow of liquid in the screw.

In another double rotation construction shown in FIG. 16, the reservoir tube 19d is rotatable in opposite directions as in the previous modification, but the screw 20d is rotatable with the tube only in one direction in which it delivers liquid to the outlet chamber 21d. The parts of this modification which correspond to parts of the preferred construction have the same reference characters with the suffix d. To rotate the screw 20d in only one direction even though the tube is rotatable in opposite directions, the screw is mounted for rotation relative to the tube and a one-way coupling 71 is provided to produce rotation of the screw in a direction for pumping liquid while preventing rotation of the screw in the opposite direction.

The separate mounting for the separately rotatable screw 20d of the modification shown in FIG. 16 comprises a hollow sleeve 72 which telescopes over the reservoir tube shaft 24d and, at opposite ends, carries bearing rings 73 and 74 which are journaled on the shaft. The shaft itself is split and its upper end is secured rigidly to the upper end of the longer supporting post 18d. At its low end, the upper section of the shaft telescopes within a hollow cup 75 secured to the lower end plate 23d of the reservoir tube 19d and carrying the lower shaft section 76 which is journaled in a bearing 77 on the lower post 17d. The upper end portion of the reservoir tube is mounted on the upper stationary section 24d of the shaft through the medium of other bearings 77. Downward movement of the screw supporting sleeve 72 is limited by engagement of the bearing ring 73 on the lower end of the sleeve with a collar 78 secured to and projecting radially from the stationary shaft section.

The one-way coupling 71 between the reservoir tube 19d and the separately rotatable screw 20d in this instance comprises a ratchet formed by the lower bearing ring of the screw which projects radially and outwardly beyond the screw supporting sleeve and is formed on its outer periphery with ratchet teeth 79. These teeth cooperate with two pawls 80 which are rotatably supported on diametrically opposite sides of the ratchet by bolts 81 threaded into the lower end plate 23d of the reservoir tube. The pawls and teeth are arranged to permit the rotation of the screw and sleeve in a counterclockwise direction as viewed from the left of FIG. 16 but would prevent rotation of the screw relative to the tube in the opposite direction. Each pawl is urged by gravity into engagement with the ratchet when the pawl is in the upper portion of each revolution and falls away from the ratchet in the other portion of each revolution. Movement of the pawls away from the ratchet is limited by their engagement with the interior of the reservoir tube. The screw is held against rotation with the tube in the clockwise direction by the friction between the ratchet ring 73 and the plate 78 secured to the stationary shaft section 24d.

If desired, the amount of liquid delivered by the screw to the outlet chamber may be adjusted by the provision of a regulator member 82 in the form of a half cylinder coaxial with the screw and mounted on the stationary shaft section 24d to rotate to different positions of angular adjustment. An arm 83 projects radially from the cup and into a position adjacent an opening 84 in the upper end plate of the reservoir tube. By removing a releasably mounted plate 85 covering such opening, the arm is accessible for varying the position of the cup. With the cup opening upwardly as shown in FIG. 16, liquid delivered by the screw when the outlet end of the screw is in the lower position of its cycle is transferred back into the reservoir tube and the flow into the outlet chamber 21d is thereby reduced. By adjusting the regulator to different higher positions, the delivery of liquid from the screw to the chamber may be increased as desired. Suitable means such as a set screw 86 may be provided to secure the regulator in adjusted position.

It will be apparent that, in the preferred rubbing and liquid applying apparatus of FIGS. 1 to 4, there are only two normally moving parts, the rubbing member 19 and the pawl 32. Yet the apparatus is of rugged, durable construction and is reliable in its operation to deliver liquid 12 only as it is needed, that is, when an animal is rubbing itself on the apparatus. These advantageous results are achieved in a simple and inexpensive manner through the provision of the Archimedes screw 20 and some means, herein the ratchet and pawl, to insure that liquid is delivered only when the animal exerts the force to turn the screw in a direction to raise the liquid. A uniform distribution of liquid is achieved by the arrangement of the outlet holes 22 at angularly spaced points around the circumference of the tube, by the staggering of the outlet holes at different distances along the tube, and by the straps 41 with their side edge portions 13 spaced from the periphery of the tube to provide surfaces which define the channels 38 and retain the liquid in the channels through surface tension. The uniform distribution and retention of the liquid where it is available for the animals is insured further by the provision of the generally triangular absorbent cloths 57.

While the invention is susceptible of various modifications and alternative constructions, I have illustrated in the drawings and described herein the preferred embodiments. It is to be understood, however, that I do not intend thereby to limit the invention by such disclosure but aim to cover all modifications and alternative constructions falling within the spirit and scope of the invention as expressed in the appended claims.

This application is a continuation-in-part of my co-pending application, Serial No. 103,640, filed April 17, 1961, now abandoned.

I claim:

1. In an animal rubbing and liquid applying apparatus, the combination of a frame adapted to rest on a horizontal supporting surface, spaced rotary bearings supported by said frame at different heights and defining an axis inclined with respect to the horizontal, an elongated hollow liquid containing tank coaxial with and rotatably supported by said bearings, an Archimedes' screw supported within said tank and having liquid carrying surfaces spiralling upwardly about said axis along the length of the tank to carry liquid from the lower end portion of the tank to the higher portion during rotation of the tank in one direction about said axis, surfaces located outside of said tank and adapted for engagement by animals for rotation of the tank in said one direction during such engagement, a direction controlling device connected to the tank and confining rotation of the tank to said one direction during engagement of said surfaces by an animal, means in said tank defining an outlet in said higher portion of the tank and communicating with said screw for the flow of liquid from the screw to said outside surfaces, and a member controlling the rate of flow of liquid from said screw to said outside surfaces through said outlet.

2. In an animal rubbing and liquid applying apparatus, the combination of a frame adapted to rest on a horizontal supporting surface, spaced rotary bearings supported by said frame at different heights and defining an axis inclined with respect to the horizontal, an elongated hollow liquid containing tank coaxial with and rotatably supported by said bearings, an Archimedes' screw supported within said tank and having liquid carrying surfaces spiralling upwardly about said axis along the length of the tank to carry liquid from the lower end portion of the tank to the higher portion during rotation of the tank in one direction about said axis, and surfaces located outside of said tank in said one direction during such engagement, a pawl and ratchet mechanism connected to and acting between said frame and said tank for confining rotation of the tank to said one direction during engagement of said surfaces by an animal, and means in said tank defining an outlet in said higher portion of the tank and communicating with said screw for the flow of liquid from the screw to said outside surfaces.

3. In an animal rubbing and liquid applying apparatus, the combination of a frame adapted to rest on a horizontal supporting surface, spaced rotary bearings supported by said frame at different heights and defining an axis inclined with respect to the horizontal, an elongated hollow liquid containing tank coaxial with and rotatably supported by said bearings, an Archimedes' screw supported within said tank and having liquid carrying surfaces spiralling upwardly about said axis along the length of the tank to carry liquid from the lower end portion of the tank to the higher portion during rotation of the tank in one direction about said axis, surfaces located outside of said tank and adapted for engagement by animals for rotation of the tank in said one direction during such engagement, said screw communicating with said outside surfaces near said higher tank portion for the flow of liquid from the screw to the surfaces and onto the hide of the animal engaging the surfaces, and a direction controlling device connected to the tank for confining rotation of the tank to said one direction during engagement of said surfaces by an animal.

4. In an animal rubbing and liquid applying apparatus, the combination of a frame adapted to rest on a horizontal supporting surface, spaced rotary bearings supported by said frame at different heights and defining an axis inclined with respect to the horizontal, an elongated hollow liquid containing tank coaxial with and rotatably supported by said bearings, an Archimedes' screw supported within said tank and having liquid carrying surfaces spiralling upwardly about said axis along the length of the tank to carry liquid from the lower end portion of the tank to the higher portion during rotation of the tank in one direction about said axis, and straps secured to and extending longitudinally of said tank on the exterior thereof and cooperating with such exterior to provide radially opposed surfaces defining channels to guide liquid downwardly along the exterior of the tank, the longitudinal edge portions of said straps being engageable by animals for rotation of the tank in said one direction during such engagement and said screw communicating with said channels at their upper end portions for the flow of liquid from the screw to the channels and onto the hide of animals engaging the straps.

5. In an animal rubbing and liquid applying apparatus, the combination of a frame adapted to rest on a horizontal supporting surface, spaced rotary bearings supported by said frame at different heights and defining an axis inclined with respect to the horizontal, an elongated hollow liquid containing tank coaxial with and rotatably supported by said bearings, an Archimedes' screw supported within said tank and having liquid carrying surfaces spiralling upwardly about said axis along the length of the tank to carry liquid from the lower end portion of the tank to the higher portion during rotation of the tank in one direction about said axis, and surfaces located outside of said tank and adapted for engagement by animals for rotation of the tank in said one direction during such engagement, said screw communicating with said outside surfaces near said higher tank portion for the flow of liquid from the screw to the surfaces and onto the hide of animals engaging the surfaces.

6. In an animal rubbing and liquid applying apparatus, the combination of a frame adapted to rest on a horizontal supporting surface, an elongated hollow tube mounted on said frame to rotate about an axis inclined relative to the horizontal, an Archimedes' screw mounted within said tube to rotate about said axis and having liquid carrying surfaces spiralling upwardly about the axis to carry liquid from a lower portion of the screw to a higher position during rotation of the screw in one direction, a coupling connecting said screw and said tube for rotation of the screw in said one direction when the tube is rotating in the same direction, and surfaces located on the outside of said tube for engagement by animals for rotation of the tube and said screw in said one direction, the upper end of said screw communicating with said outside surfaces to deliver liquid to the surfaces during rotation of the screw in said direction.

7. The combination of claim 6 in which said screw terminates at its upper end in an outlet chamber formed by the upper end of said tube and communicating with the exterior of the tube through a plurality of holes angularly spaced in an annular series about said axis, said holes being of triangular shape each elongated longitudinally of said axis with one corner pointing toward the lower end of said tube.

8. The combination of claim 6 in which said screw terminates at its upper end in an outlet chamber formed by the upper end of said tube and communicating with the exterior of the tube through a plurality of holes angularly spaced in an annular series about said axis and located generally at the intersection of the tube with a plane inclined relative to the axis of the tube so that the holes vary in spacing from the lower end of the tube in a sine wave configuration with the highest hole approximately in alinement with said upper end of said screw in a direction extending longitudinally of said axis.

9. The combination of claim 6 in which said screw terminates at its upper end in an outlet chamber formed by the upper end of said tube and communicating with the exterior of the tube through a plurality of holes angularly spaced in an annular series about said axis and located generally at the intersection of the tube with a plane inclined relative to the axis of the tube so that the holes vary in spacing from the lower end of the tube in a sine wave configuration with the highest hole approximately in alinement with said upper end of said screw in a direction extending longitudinally of said axis, said holes each being of elongated wedge shape with its pointed end pointing longitudinally of said axis and toward the lower end of said tube.

10. In an animal rubbing and liquid applying apparatus, the combination of a frame adapted to rest on a horizontal supporting surface, an elongated hollow rubbing member mounted on said frame to rotate about an axis inclined relative to the horizontal, a liquid containing reservoir mounted on said frame and located adjacent a lower portion of said member, an Archimedes' screw mounted within said member to rotate about said axis and having liquid carrying surfaces spiralling upwardly from said reservoir about the axis to carry liquid from a lower portion of the member to a higher portion of the member during rotation of the screw in one direction, surfaces located on the outside of said member for engagement by animals to rotate the member and said screw in said one direction, the upper end of said screw communicating with said outside surfaces for the flow of liquid from the screw to the surfaces, and straps secured to and extending longitudinally of said member on the exterior thereof to provide said outside surfaces and cooperate with the member to provide radially facing opposed surfaces defining channels to receive the liquid and guide the same downwardly along the member.

11. In an animal rubbing and liquid applying apparatus, the combination of supporting frame parts, an elongated hollow rubbing member mounted on said parts, to rotate about a predetermined axis, an Archimedes' screw mounted to rotate about said axis and having liquid carrying surfaces spiralling from a first end portion of the member to the other about the axis to carry liquid from the first end portion of the member to the other end portion of the member during rotation of the screw in one direction, a coupling connecting said screw and said member for rotation of the screw in said one direction when said member rotates in the same direction, and surfaces located on the outside of said member for engagement by animals to rotate the member and said screw in said one direction, the upper end of said screw communicating with said outside surfaces for the flow of liquid from the screw to the surfaces.

12. The combination of claim 11 in which said rubbing member is rotatable in opposite directions about said axis, said screw is mounted for rotation relative to said member, and a one-way coupling is connected to said screw to permit rotation of the screw with said member in said one direction for advance of liquid from said one end portion of the screw to said other end portion while preventing rotation of the screw with said member in said opposite direction.

13. The combination of claim 11 in which said rubbing member is rotatable in opposite directions about said axis, said screw is mounted in said member to rotate with the member in both directions, check valve means is provided at said first end portion of said screw to permit entry of liquid into the screw during rotation of the screw with the member in said one direction and to prevent the exit of liquid from the screw through the first end portion during rotation of the screw in the opposite direction, a second Archimedes' screw is mounted within said member to rotate therewith in said opposite directions and has liquid carrying surfaces spiralling about said axis in a direction opposite to the spiral of the first mentioned screw to carry liquid from a first end portion of the second screw to the other end portion during rotation of the screw with said member in said opposite direction, and second check valve means is provided at said first end portion of said second screw to permit entry of liquid into the screw during rotation of the screw in said opposite direction and prevent the exit of liquid from the screw during rotation of the screw with said member in said one direction.

14. The combination of claim 11 in which said rubbing member is rotatable in opposite directions about said axis, said screw is mounted in said member to rotate with the member in both directions, and check valve means is provided at said first end portion of said screw to permit entry of liquid into the screw during rotation of the screw with the member in said one direction and to prevent the exit of liquid from the screw through the first end portion during rotation of the screw in the opposite direction.

15. In an animal rubbing and liquid applying apparatus, the combination of a frame adapted to rest on a horizontal supporting surface, an elongated rubbing member mounted on said frame to rotate about an axis inclined relative to the horizontal, said member comprising a cylinder and a plurality of elongated straps secured to and extending longitudinally of the cylinder on its exterior and providing surfaces facing radially toward the cylinder and cooperating therewith to define channels to guide liquid downwardly along the length of the cylinder, and means for delivering liquid to the upper end portions of said channels during rotation of said cylinder, the longitudinal edge portions of said straps providing animal engaging surfaces.

16. In animal rubbing and liquid applying apparatus, the combination of a frame adapted to rest on a horizontal supporting surface, an elongated rubbing member mounted on said frame to rotate about an axis inclined relative to the horizontal at a predetermined angle, said member comprising a cylinder having elongated recesses extending longitudinally of said axis and opening radially and outwardly at angularly spaced points around the cylinder periphery on its exterior, means for delivering liquid to the upper end portions of said recesses during rotation of said cylinder, and liquid distributing means comprising bars extending along and lying within said recesses, sheets of cloth associated individually with the respective bars and each having a first edge portion clamped between the associated bar and said cylinder periphery and another edge intersecting said first edge portion at said predetermined angle so that the second edge is disposed generally horizontally, and releasable clamping means for holding said bars against said sheets and the sheets against said cylinder periphery.

17. In animal rubbing and liquid applying apparatus, the combination of a frame adapted to rest on a horizontal supporting surface, an elongated rubbing member mounted on said frame to rotate about an axis inclined relative to the horizontal at a predetermined angle, means for delivering liquid to the upper end portions of said member as it rotates about said axis, and liquid distributing means comprising sheets of cloth each having a first edge portion clamped against the member in parallel with said axis and another edge intersecting said first edge portion at said predetermined angle so that the second edge is disposed generally horizontally, and releasable clamping means for holding said sheets against said members.

18. For use with animal rubbing and liquid applying apparatus having a frame adapted to rest on a horizontal supporting surface, an elongated rubbing member mounted on said frame to rotate about an axis inclined relative to the horizontal at a first angle, said member comprising a cylinder having elongated recesses extending longitudinally of said axis and opening radially and outwardly at angularly spaced points around the cylinder periphery on its exterior, and means for delivering liquid to the upper end portions of said recesses during rotation of said cylinder, the combination of liquid distributing means comprising bars extending along and lying within said recesses, sheets of cloth associated individually with the respective bars and each having a first edge portion clamped between the associated bar and said cylinder periphery and another edge intersecting said first edge portion at said predetermined angle so that the second edge is disposed generally horizontally, and releasable clamping members for holding opposite ends of said bars against said sheets and the sheets against said cylinder periphery at spaced points along the cylinder, said bars being attached to one of said members and detachable from the other member.

19. In an animal rubbing and liquid applying apparatus, the combination of a frame adapted to rest on a horizontal supporting surface and having spaced upstanding posts of different lengths, bearings carried by the upper end portions of said posts and defining an axis inclined relative to the horizontal, an elongated rubbing member mounted in said bearings to rotate about said axis and having exterior surfaces adapted to be engaged by animals to rotate the member, and means for delivering liquid to the upper end portion of said exterior surfaces during rotation of said member for gravitation of of the liquid along the surfaces, one of said posts being of selectively adjustable length to permit variation of the inclination of said axis and thereby the rate of flow of said liquid along said surfaces.

20. In an animal rubbing and liquid applying apparatus, the combination of a frame adapted to rest on a horizontal supporting surface and having spaced upstanding parts of different lengths, bearings carried by the upper end portions of said posts and defining an axis inclined relative to the horizontal, an elongated rubbing member mounted in said bearings to rotate about said axis and having exterior surfaces adapted to be engaged by animals to rotate the member, means for delivering liquid to the upper end portion of said exterior surfaces during rotation of said member for gravitation of the liquid along the surfaces, and means for adjusting the angle of inclination of said axis to vary the rate of flow of said liquid along said surfaces.

References Cited in the file of this patent

UNITED STATES PATENTS

| | | |
|---|---|---|
| 1,256,828 | Perry | Feb. 19, 1918 |
| 1,528,402 | Clements | Mar. 3, 1925 |
| 1,552,846 | Kurath | Sept. 8, 1925 |
| 3,038,445 | Fleming | June 12, 1962 |
| 3,055,340 | Davis | Sept. 25, 1962 |